United States Patent
Nishiyama (10) Patent No.: US 8,661,123 B2
(45) Date of Patent: Feb. 25, 2014

(54) MANAGED DEVICE, DEVICE MANAGEMENT APPARATUS, AND DEVICE MANAGEMENT SYSTEM

(75) Inventor: Yoko Nishiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 13/226,532

(22) Filed: Sep. 7, 2011

(65) Prior Publication Data

US 2012/0072587 A1 Mar. 22, 2012

(30) Foreign Application Priority Data

Sep. 16, 2010 (JP) .................................. 2010-208214
Jul. 12, 2011 (JP) .................................. 2011-153587

(51) Int. Cl.
*G06F 15/173* (2006.01)

(52) U.S. Cl.
USPC ............................ 709/224; 709/203; 540/506

(58) Field of Classification Search
USPC .................................. 709/203, 224; 340/506
See application file for complete search history.

(56) References Cited

U.S. PATENT DOCUMENTS

| | | | | |
|---|---|---|---|---|
| 8,214,494 | B1 * | 7/2012 | Slavin | 709/224 |
| 2006/0056426 | A1 * | 3/2006 | Wakameda et al. | 370/401 |
| 2008/0252440 | A1 * | 10/2008 | Meiner | 340/506 |
| 2011/0205580 | A1 | 8/2011 | Nishiyama | |

FOREIGN PATENT DOCUMENTS

| | | |
|---|---|---|
| JP | 2009-244928 | 10/2009 |
| JP | 2010-049364 | 3/2010 |

\* cited by examiner

*Primary Examiner* — Yves Dalencourt
(74) *Attorney, Agent, or Firm* — IPUSA, PLLC (57) ABSTRACT

A device management system includes a managed device and a device management apparatus. The managed device includes a detection unit detecting a status change indicating a power-on or a network setting change of the managed device, a generating unit generating alert information based on the detected status change, and a transmitting unit configured to transmit the generated alert information to the device management apparatus. The device management apparatus includes a registration/update determining unit comparing the alert information with device management information and determining, based on the comparison result, whether it is necessary to perform a registration process or an update process on the device management information, and a registration/updating unit registering information extracted from the alert information in the device management information or updating a corresponding information item in the device management information with the information extracted from the alert information according to the determination result.

6 Claims, 9 Drawing Sheets

```
<?xml version=1.0' encoding=UTF-8'>
<SOPA-ENV:Envelope xmlns:SOAP-ENV="http://schemas.xmlsoap.org/soap/envelope/">
  <SOAP-ENV:Body>
    <alert:DevicePowerOn xmlns:alert="http://myDeviceManagement.org">    ← R1
      ....
      <IP>133.139.196.XXX</IP>                                           ← R11
      <SerialNo>G123456</SerialNo>                                       ← R12
      ....
    </alert:DevicePowerOn>
  </SOAP-ENV:Body>
</SOAP-ENV:Envelope>
```

| MANAGEMENT NUMBER | DEVICE IDENTIFICATION | | REGISTRATION /UPDATE DATE AND TIME | |
| --- | --- | --- | --- | --- |
| | DEVICE NUMBER | NETWORK SETTING | | |
| 1 | G060731 | 133.139.210.003 | 2009/04/12 09:15:34 | ... |
| 2 | S651013 | 133.139.196.001 | 2008/10/01 10:15:20 | ... |
| 3 | H901230 | 133.139.213.012 | 2010/03/10 09:10:55 | ... |
| ... | ... | ... | ... | ... |

MANAGED DEVICE, DEVICE MANAGEMENT APPARATUS, AND DEVICE MANAGEMENT SYSTEM

CROSS-REFERENCE TO RELATED APPLICATIONS

The present application is based upon and claims the benefit of priority of Japanese Patent Application No. 2010-208214, filed on Sep. 16, 2010 and Japanese Patent Application No. 2011-153587, filed on Jul. 12, 2011, the entire contents of which are incorporated herein by reference.

BACKGROUND OF THE INVENTION

1. Field of the Invention

An aspect of this disclosure relates to a device management system.

2. Description of the Related Art

There is a known device management system where a device management apparatus periodically polls managed devices (devices to be managed by the device management apparatus) to obtain device information and manages the managed devices based on the obtained device information.

More specifically, the device management apparatus manages the managed devices as described below. The device management apparatus receives network settings (Internet protocol (IP) addresses) that are, for example, multicasted by managed devices in the device management system and thereby identifies the managed devices. Next, the device management apparatus periodically polls the managed devices based on the network settings to obtain device information of the managed devices. Then, the device management apparatus registers the obtained device information in device management information and manages the managed devices based on the device management information.

Here, in a user environment where such a device management system is installed, it is possible that devices are moved from one department to another, old devices are replaced with new devices, and new devices are installed. These changes in the system configuration may result in changes in device identification information such as network settings of the devices.

For this reason, in a device management system, it is preferable to update device management information according to changes in the system configuration resulting from the movement and replacement of devices and the installation of new devices.

Japanese Laid-Open Patent Publication No. 2009-244928, for example, discloses a communication device management apparatus that automatically detects replacement of communication devices.

However, since the disclosed communication device management apparatus detects communication devices (i.e., managed devices) by polling, the detection accuracy depends on the polling interval. If the polling interval is long, information on the communication devices is not obtained or updated for a long period of time and the reliability of the communication device management apparatus is reduced. Meanwhile, simply reducing the polling interval may increase the network traffic. Thus, with the disclosed technology, it is difficult to flexibly and reliably detect changes in a system configuration.

SUMMARY OF THE INVENTION

In an aspect of this disclosure, there is provided a device management system including at least one managed device and a device management apparatus connected via a network to the managed device. The managed device includes a detection unit configured to detect a status change indicating a power-on or a network setting change of the managed device, a generating unit configured to generate alert information based on the detected status change, and a transmitting unit configured to transmit the generated alert information to the device management apparatus. The device management apparatus includes a storing unit configured to store device management information for managing the managed device, a registration/update determining unit configured to compare the alert information received from the managed device with the device management information and determine, based on the comparison result, whether it is necessary to perform a registration process or an update process on the device management information, and a registration/updating unit configured to register information extracted from the alert information in the device management information or update a corresponding information item in the device management information with the information extracted from the alert information if the registration/update determining unit determines that it is necessary to perform the registration process or the update process.

DESCRIPTION OF THE PREFERRED EMBODIMENTS

Preferred embodiments of the present invention are described below with reference to the accompanying drawings.

<System Configuration>

Figure 1:
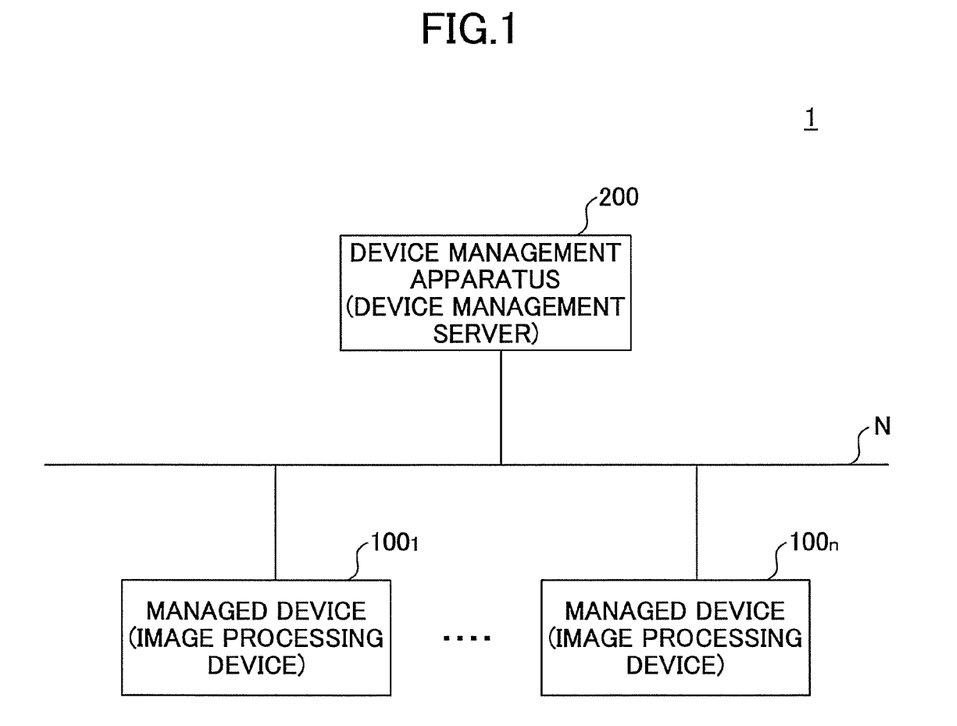
FIG. 1 is a drawing illustrating an exemplary configuration of a device management system.

FIG. 1 is a drawing illustrating an exemplary configuration of a device management system 1 according to an embodiment.

As illustrated in FIG. 1, the device management system 1 includes one or more managed devices $100_1$-$100_n$ (may be called a managed device 100 or managed devices 100 when distinction is not necessary) and a device management apparatus (device management server) 200 that are connected via a data communication channel N (hereafter called a network N) such as a local area network (LAN).

The managed device 100 is, for example, an image processing device such as a multifunction peripheral (MFP) or a laser printer. The device management apparatus 200 obtains device information from the managed devices 100, registers the obtained device information in device management information, and manages the managed devices 100 based on the device management information. The device management apparatus 200 may be implemented, for example, by an information processing apparatus such as a personal computer (PC).

With the above configuration, the device management system 1 can provide various device management functions (or services).

<Hardware Configuration>

Figure 2:
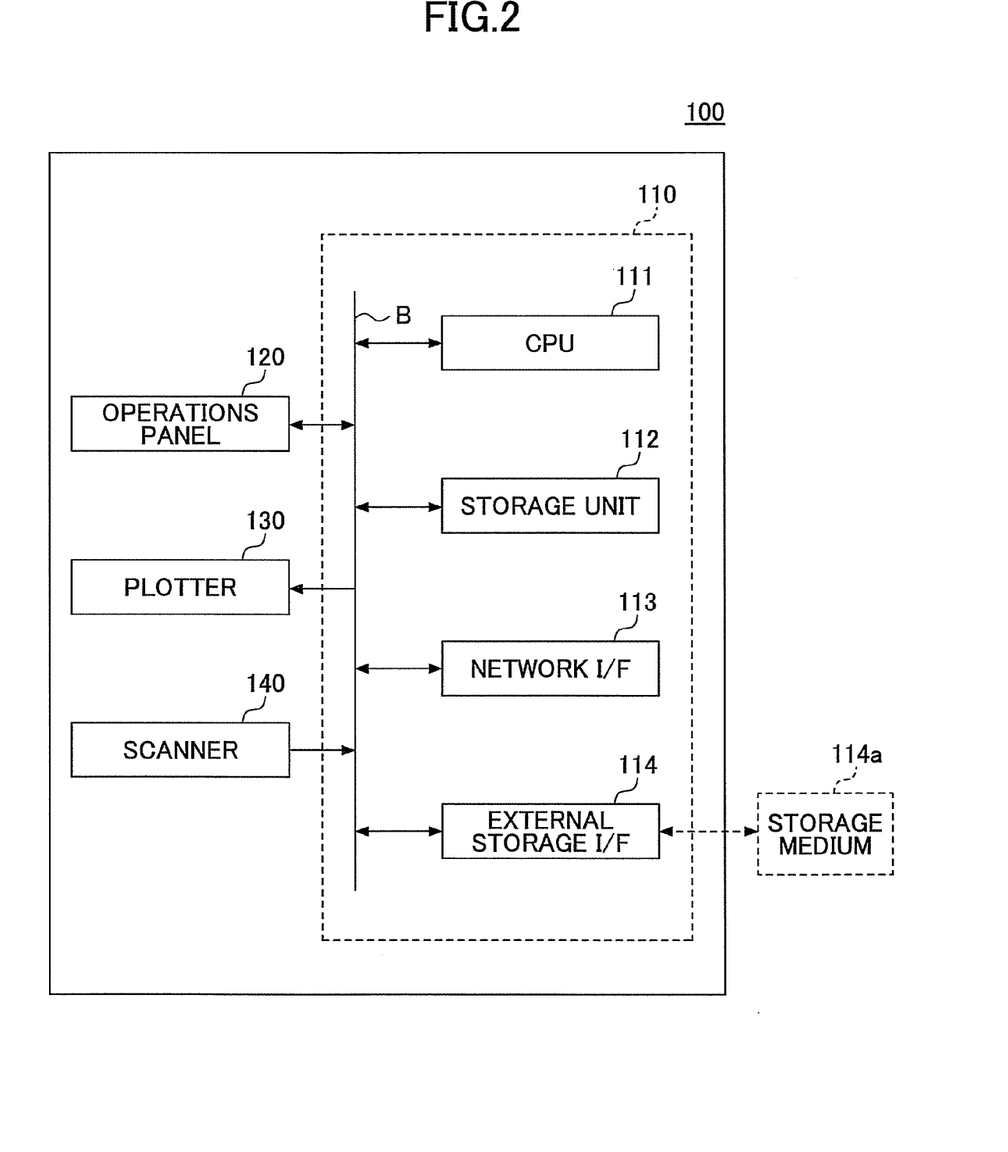
FIG. 2 is a block diagram illustrating an exemplary hardware configuration of a managed device.
Figure 3:
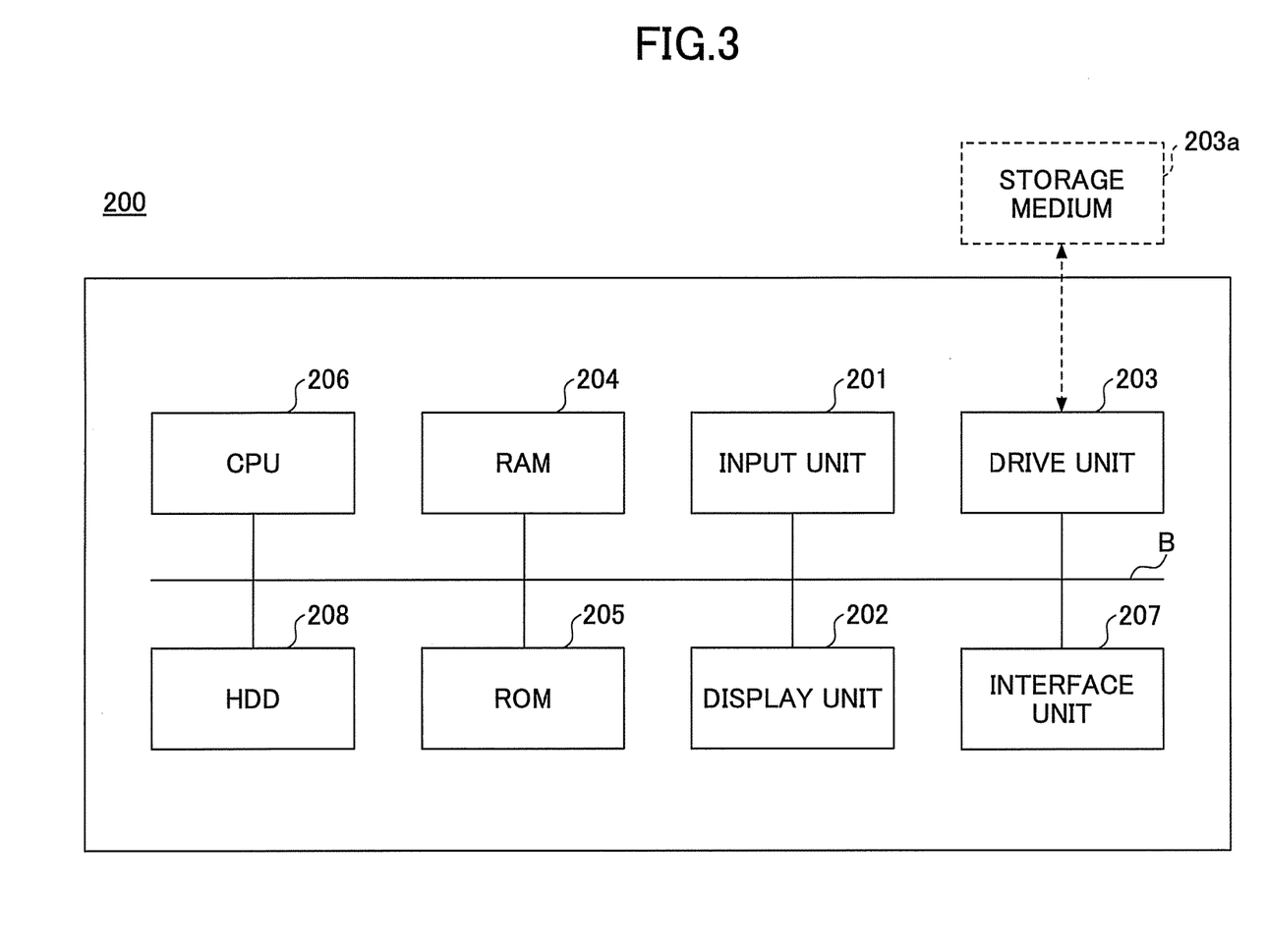
FIG. 3 is a block diagram illustrating an exemplary hardware configuration of a device management apparatus.

Exemplary hardware configurations of the managed device 100 and the device management apparatus 200 of this embodiment are described below. In this embodiment, it is assumed that the managed device 100 is implemented as an image processing device 100.

[Managed Device]

FIG. 2 is a block diagram illustrating an exemplary hardware configuration of the image processing device 100.

As illustrated in FIG. 2, the image processing device 100 includes a controller 110, an operations panel 120, a plotter 130, and a scanner 140 that are connected to each other via a bus B.

The operations panel 120 includes a display unit for providing information such as device information to the user and an input unit for receiving user inputs such as settings and instructions. The plotter 130 includes an image forming unit for forming an image on a recording medium (e.g., paper). For example, the plotter 130 forms an image by electrophotography or inkjet printing. The scanner 140 optically scans a document and generates image data.

The controller 110 includes a central processing unit (CPU) 111, a storage unit 112, a network I/F 113, and an external storage I/F 114 that are connected via the bus B.

The CPU 111 executes programs and thereby controls the entire image processing device 100. The storage unit 112 stores programs and data (e.g., image data). The storage unit 112, for example, includes a random access memory (RAM) implemented by a volatile memory, a read only memory (ROM) implemented by a non-volatile memory, and a hard disk drive (HDD) as a mass storage. The RAM is used as a work area (a storage area where programs and data are temporarily stored) by the CPU 111. The ROM and the HDD store the programs and data. The CPU 111 loads the programs from the ROM or the HDD into the RAM and executes the loaded programs.

The network I/F 113 is an interface for connecting the image processing device 100 to the network N. With the network I/F 113, the image processing device 100 can perform data communications with the device management apparatus 200.

The external storage I/F 114 is an interface for connecting a storage medium 114a used as an external storage to the image processing device 100. The image processing device 100 can read and write data from and to the storage medium 114a via the external storage I/F 114. The storage medium 114a is, for example, implemented by a secure digital (SD) memory card, a universal serial bus (USB) memory, a compact disk (CD), or a digital versatile disk (DVD).

With the above hardware configuration, the image processing device 100 can provide various image processing functions (image processing services).

[Device Management Apparatus]

FIG. 3 is a block diagram illustrating an exemplary hardware configuration of the device management apparatus 200 of this embodiment.

As illustrated in FIG. 3, the device management apparatus 200 includes an input unit 201, a display unit 202, a drive unit 203, a random access memory (RAM) 204, a read only memory (ROM) 205, a central processing unit (CPU) 206, an interface unit 207, and a hard disk drive (HDD) 208 that are connected to each other via a bus B.

The input unit 201 includes, for example, a keyboard and a mouse, and is used to input instructions (or operation signals) to the device management apparatus 200. The display unit 202 displays, for example, processing results of the device management apparatus 200.

The interface unit 207 connects the device management apparatus 200 to the network N. The device management apparatus 200 can perform data communications with the image processing device (managed device) 100 via the interface unit 207.

The HDD 208 is a non-volatile storage medium for storing various programs and data. For example, the HDD 208 stores basic software (e.g., an operating system such as Windows (trademark/registered trademark) or UNIX (trademark/registered trademark)) for controlling the entire device management apparatus 200, and applications for implementing various functions (e.g., device management functions). The HDD 208 may manage the stored programs and data using a file system and/or a database (DB).

The drive unit 203 is an interface between the device management apparatus 200 and a removable storage medium 203a. The device management apparatus 200 can read and write data from and to the storage medium 203a via the drive unit 203. Examples of the storage medium 103a include a floppy (flexible) disk (FD), a compact disk (CD), a digital versatile disk (DVD), an SD memory card, and a USB memory.

The ROM 205 is a non-volatile semiconductor memory (storage unit) that can retain data even when the power is turned off. For example, the ROM 205 stores programs and data such as a basic input/output system (BIOS) that is executed when the device management apparatus 200 is turned on, and system and network settings of the device management apparatus 200. The RAM 204 is a volatile semiconductor memory (storage unit) for temporarily storing programs and data. The CPU 206 loads programs and data from storage units (e.g., the HDD 208 and the ROM 205) into the RAM 204 and executes the loaded programs to control the device management apparatus 200 and to perform various functions.

With the above hardware configuration, the device management apparatus 200 can provide various device management functions (or services).

<Device Management Functions>

Device management functions of this embodiment are described below.

In the device management system 1, the managed device 100 detects its own status change (e.g., power-on/off or a network setting change) and generates alert information based on the detected status change. Then, the managed device 100 transmits the generated alert information to the device management apparatus 200. The device management apparatus 200 compares the alert information with the device management information and determines whether it is necessary to perform a registration process or an update process on the device management information. If it is determined that it is necessary to perform a registration process or an update process, the device management apparatus 200 registers new information extracted from the alert information in the device management information or updates the corresponding information item in the device management information with the latest information extracted from the alert information. The device management system 1 of this embodiment provides device management functions as described above.

In a related-art device management system, managed devices are detected by polling and therefore the detection accuracy depends on the polling interval. If the polling interval is long, information on the managed devices are not obtained or updated for a long period of time and the reliability of the device management system is reduced. Meanwhile, simply reducing the polling interval may increase the network traffic. Thus, with the related-art device management system, it is difficult to flexibly and reliably detect changes in a system configuration.

Meanwhile, in the device management system 1 of this embodiment, the managed device 100 actively transmits alert information that enables the device management apparatus 200 to determine whether it is necessary to perform a registration process or an update process on the device management information.

The device management system 1 configured as described above makes it possible to flexibly and reliably detect changes in the system configuration, and also makes it possible to reduce the network traffic related to the detection of changes in the system configuration.

Exemplary functional configurations and operations of the device management system 1 are described below.

Figure 4:
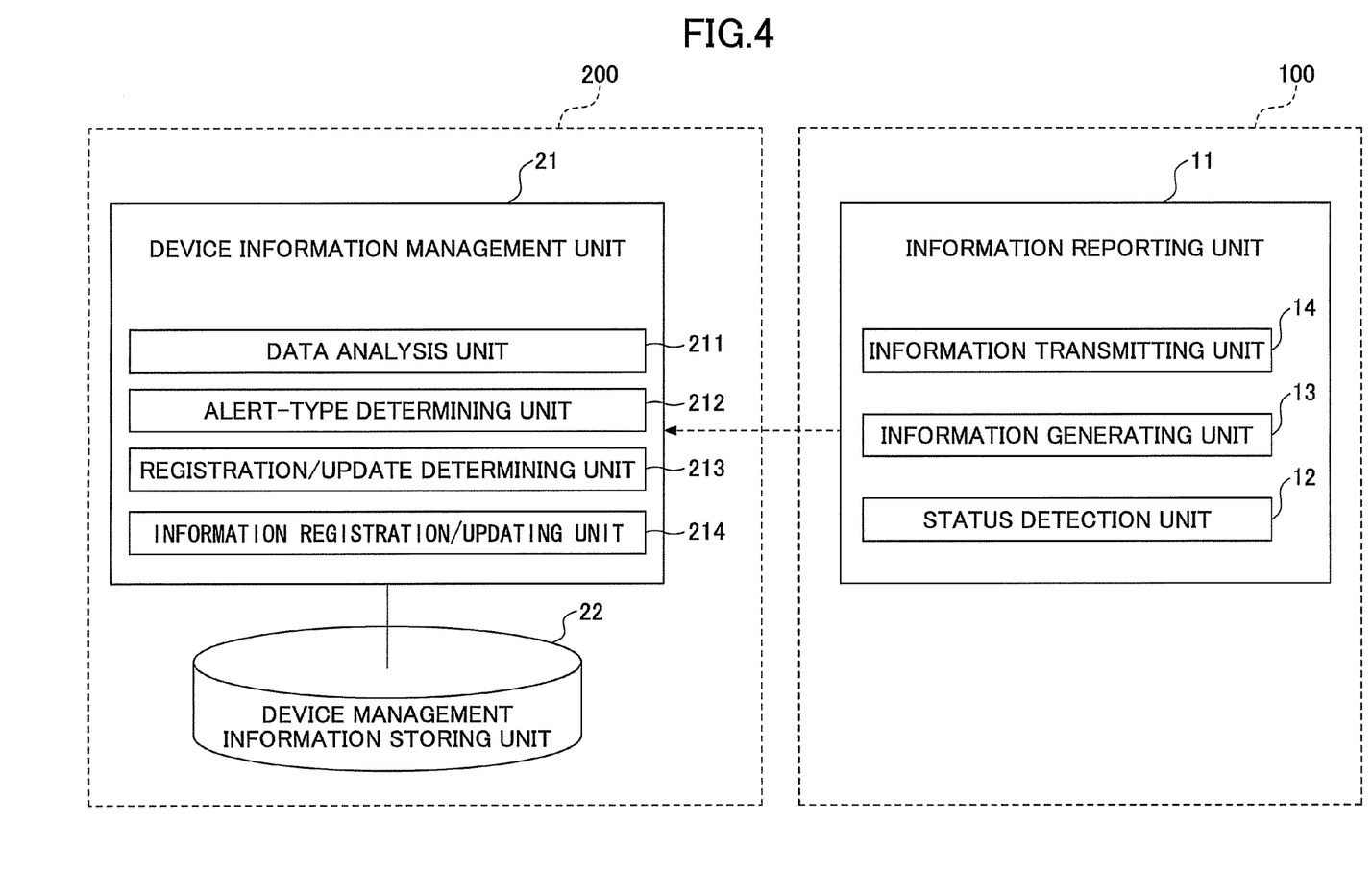
FIG. 4 is a block diagram illustrating exemplary functional configurations of a managed device and a device management apparatus.

FIG. 4 is a block diagram illustrating exemplary functional configurations of the managed device 100 and the device management apparatus 200 constituting the device management system 1.

As illustrated in FIG. 4, the managed device 100 includes an information reporting unit 11 and the device management apparatus 200 includes a device information management unit 21.

[Functional Configuration of Managed Device]

The information reporting unit 11 is a functional unit that reports a status change detected at the managed device 100 to the device management apparatus 200. The information reporting unit 11 includes a status detection unit 12, an information generating unit 13, and an information transmitting unit 14.

The status detection unit 12 is a functional unit that detects a status change of the managed device 100. In the device management apparatus 200 of this embodiment, device identification information such as a network setting and a device number of the managed device 100 and device information (obtained information) of the managed device 100 are associated with each other and stored as device management information. If the device identification information of the managed device 100 is changed, it is necessary to update the corresponding information item in the device management information. For this purpose, the status detection unit 12 detects a status change such as power-on/off or a network setting change resulting from movement or replacement of the managed device 100 or installation of a new managed device 100.

The information generating unit 13 is a functional unit that generates alert information based on the detected status change. The alert information is used by the device management apparatus 200 to determine whether it is necessary to perform a registration process or an update process on the device management information.

Figure 5A:
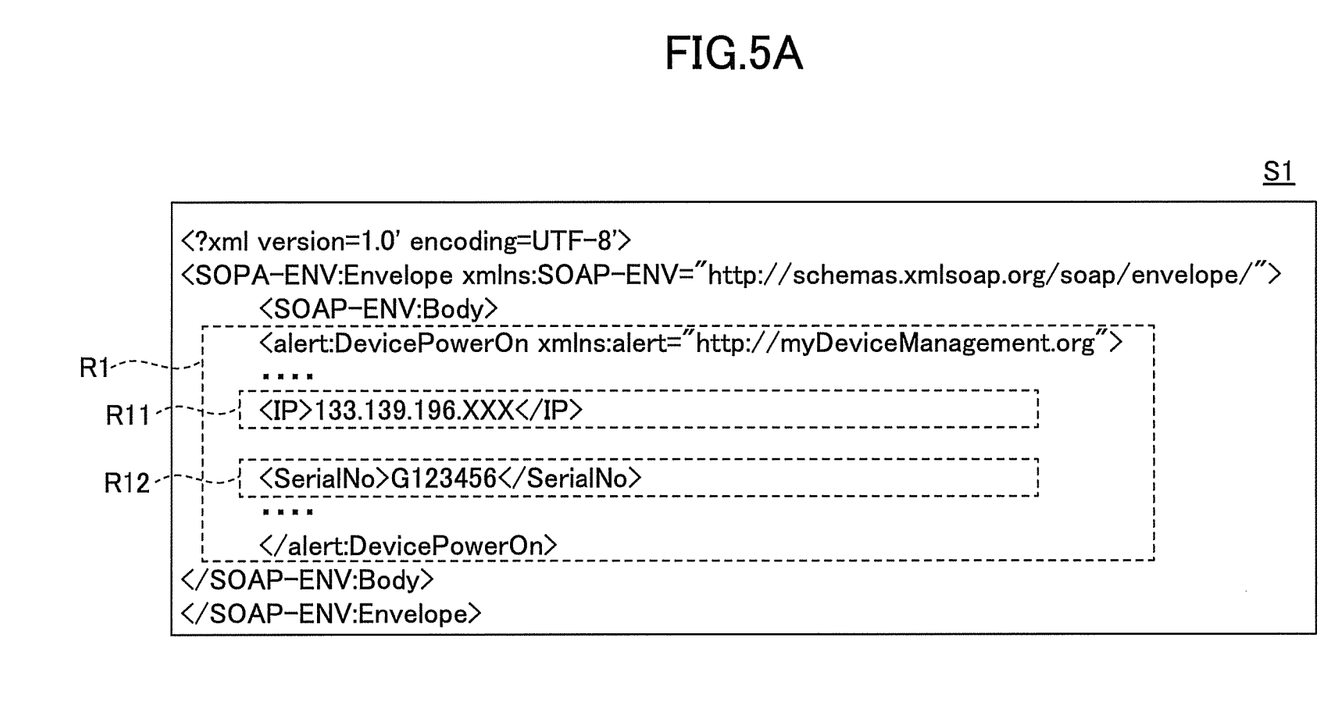
FIG. 5A is a drawing illustrating an example of alert information.
Figure 5B:
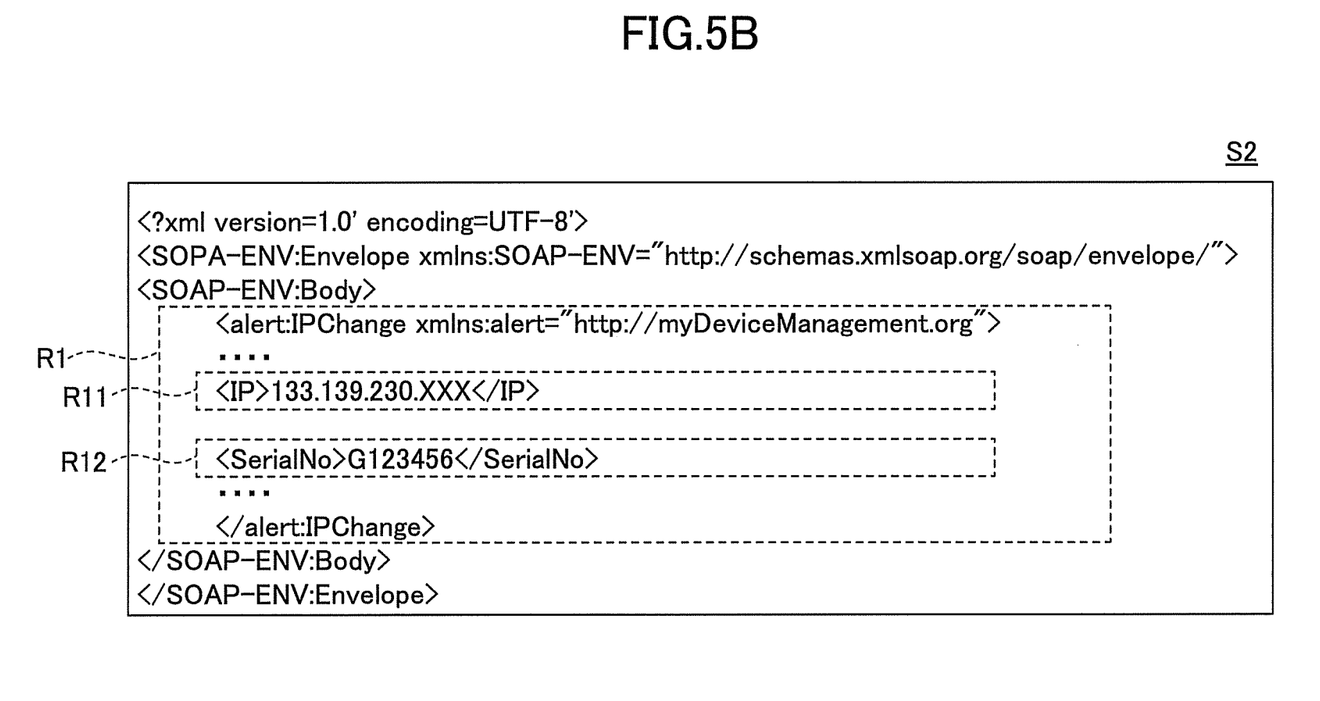
FIG. 5B is a drawing illustrating another example of alert information.

FIGS. 5A and 5B illustrate exemplary alert information S1 and alert information S2 generated by the information generating unit 13.

The alert information S1 (power-on alert) is exemplary alert information (alert message) generated when the power of the managed device 100 is turned on. The alert information S2 (IP change alert or network-setting change alert) is exemplary alert information (alert message) generated when the network setting of the managed device 100 is changed. Hereafter, "alert information S" may be used as a generic term for the alert information S1 and the alert information S2.

As illustrated in FIGS. 5A and 5B, the alert information S is a message defined by tags. In this example, the alert information S is structured as a Simple Object Access Protocol (SOAP) message. The alert information S includes <alert> tag data R1 defining a parameter (status change parameter) indicating the detected status change of the managed device 100. Examples of status change parameters include "DevicePowerOn" and "IPChange". The <alert> tag data R1 have a hierarchical structure and include tag data defining device identification information. For example, the <alert> tag data R1 include <IP> tag data R11 defining a network setting (IP address) and <SerialNo> tag data R12 defining a device number.

The information generating unit 13 generates the alert information S having a data structure as described above and including the detected status change and the device identification information of the managed device 100.

However, the alert information S is not limited to a SOAP message defined by tags. Any data structure may be used for the alert information S as long as the device management apparatus 200 can analyze the alert information S and extract the status change parameter and the device identification information of the managed device 100.

The information transmitting unit 14 is a functional unit that transmits the generated alert information S to the device management apparatus 200. The information transmitting unit 14 transmits the alert information S based on a preset network setting (a destination IP address) of the device management apparatus 200. Also, the information transmitting unit 14 determines a communication protocol for communications with the device management apparatus 200 according to the data structure of the alert information S. In this embodiment, it is assumed that SOAP is used as the communication protocol for communications between the managed device 100 and the device management apparatus 200.

However, any other communication protocol such as the HyperText Transfer Protocol (HTTP) or a proprietary protocol may be used for communications between the managed device 100 and the device management apparatus 200.

[Functional Configuration of Device Management Apparatus]

The device information management unit 21 registers information obtained from the managed devices 100 in the device management information and manages the registered information for the respective managed devices 100. The device information management unit 21 accesses a device management information storing unit 22 storing the device management information and performs data manipulation to manage the device management information. Examples of data manipulation include data reference (search), data identification (retrieval), data registration (addition), data update (overwriting), and data removal (erasing). The device management information storing unit 22 is, for example, implemented by a storage area of a storage unit (e.g., the HDD 208) of the device management apparatus 200.

Details of device management information are described below.

Figure 6:
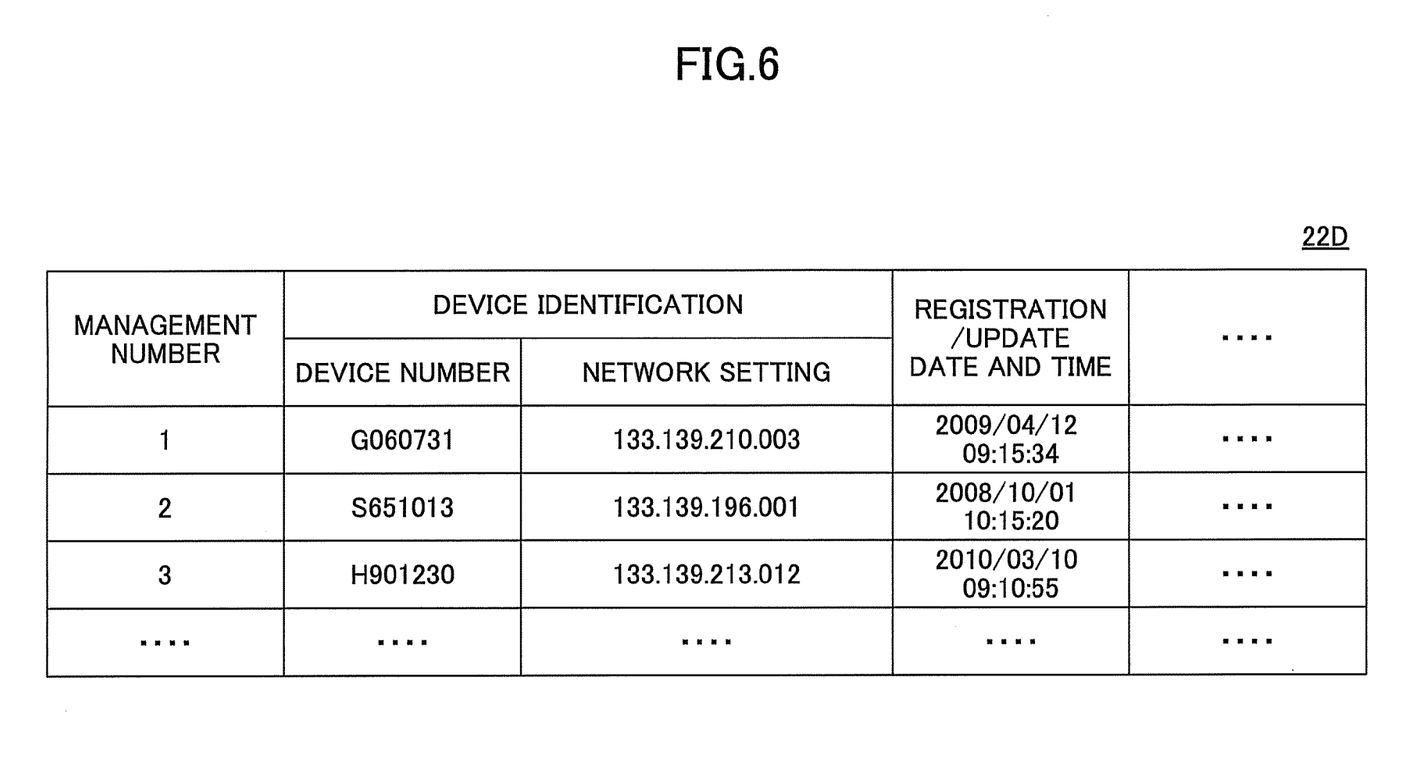
FIG. 6 is a table illustrating exemplary device management information.

FIG. 6 is a table illustrating exemplary device management information 22D.

As illustrated in FIG. 6, the device management information 22D includes records for the respective managed devices 100 and each record includes fields (or information items) such as "management number", "device identification", and "registration/update date and time". The "management number" field is used to manage the managed device 100 or the record of the managed device 100. For example, the "management number" field contains a unique number that is generated and assigned to the managed device 100 when information on the managed device 100 is registered. The "device identification" field includes a "device number" field and a "network setting" field containing device identification information for identifying the managed device 100. The "device number" field contains a device number such as a serial number of the managed device 100. The "network setting" field contains a network setting such as an IP address of the managed device 100. The "registration/update date and time" field contains the date and time when information on the managed device 100 is registered or updated. For example, the "registration/update date and time" field contains the date and time when information on the managed device 100 is stored in the device management information storing unit 22.

Each record of the device management information 22D may further include fields for storing other information (e.g., status information) obtained from the managed device 100.

When the alert information S is received from the managed device 100, the device information management unit 21 determines the type of the alert information S and refers to the device management information 220 to determine whether it is necessary to perform a registration process or an update process on the device management information 22D. If it is determined that it is necessary to perform a registration process, the device information management unit 21 registers information (or values) extracted from the alert information S in the device management information 22D. If it is determined that it is necessary to perform an update process, the device information management unit 21 updates the corresponding information item in the device management information 22D with information (or a value) extracted from the alert information S. For the above process, the device information management unit 21 includes a data analysis unit 211, an alert-type determining unit 212, a registration/update determining unit 213, and an information registration/updating unit 214.

The data analysis unit 211 is a functional unit that analyzes the alert information S received from the managed device 100. The data analysis unit 211 analyzes the alert information S according to its data structure and thereby extracts information such as a status change parameter and device identification information from the alert information S.

The alert-type determining unit 212 is a functional unit that determines the type of the alert information S. Based on the extracted status change parameter, the alert-type determining unit 212 determines whether the alert information S is a power-on alert indicating that the managed device 100 has just been turned on or a network-setting change alert indicating that the network setting of the managed device 100 has been changed.

The registration/update determining unit 213 is a functional unit that determines whether it is necessary to perform a registration process or an update process on the device management information 22D. Based on the extracted device identification information including a network setting and/or a device number, the registration/update determining unit 213 refers to the "network setting" field and/or the "device number" field of the device management information 22D. The registration/update determining unit 213 compares the network setting and/or the device number with values in the "network setting" field and/or the "device number" field and thereby determines whether it is necessary to register the network setting and/or the device number in the device management information 22D or update the device management information 22D with the network setting and/or the device number. That is, the registration/update determining unit 213 compares the alert information S representing a status change of the managed device 100 with the device management information 22D and determines, based on the comparison result, whether it is necessary to perform a registration process or an update process on the device management information 22D. In the case where an update process is necessary, the registration/update determining unit 213 also identifies a field(s) (the "network setting" field and/or the "device number" field) of the corresponding record in the device management information 22D to be updated.

When it is necessary to perform a registration process, the information registration/updating unit 214 registers the network setting and the device number extracted from the alert information S in the corresponding fields of the device management information 22D. In this case, the information registration/updating unit 214 also registers other information items obtained from the managed device 100 in association with the network setting and the device number. When it is necessary to perform an update process, the information registration/updating unit 214 updates the value(s) in the identified field(s) with the network setting and/or the device number extracted from the alert information S.

As described above, in the device management apparatus 200 of this embodiment, device management functions are provided by collaboration among the above described functional units.

Figure 7:
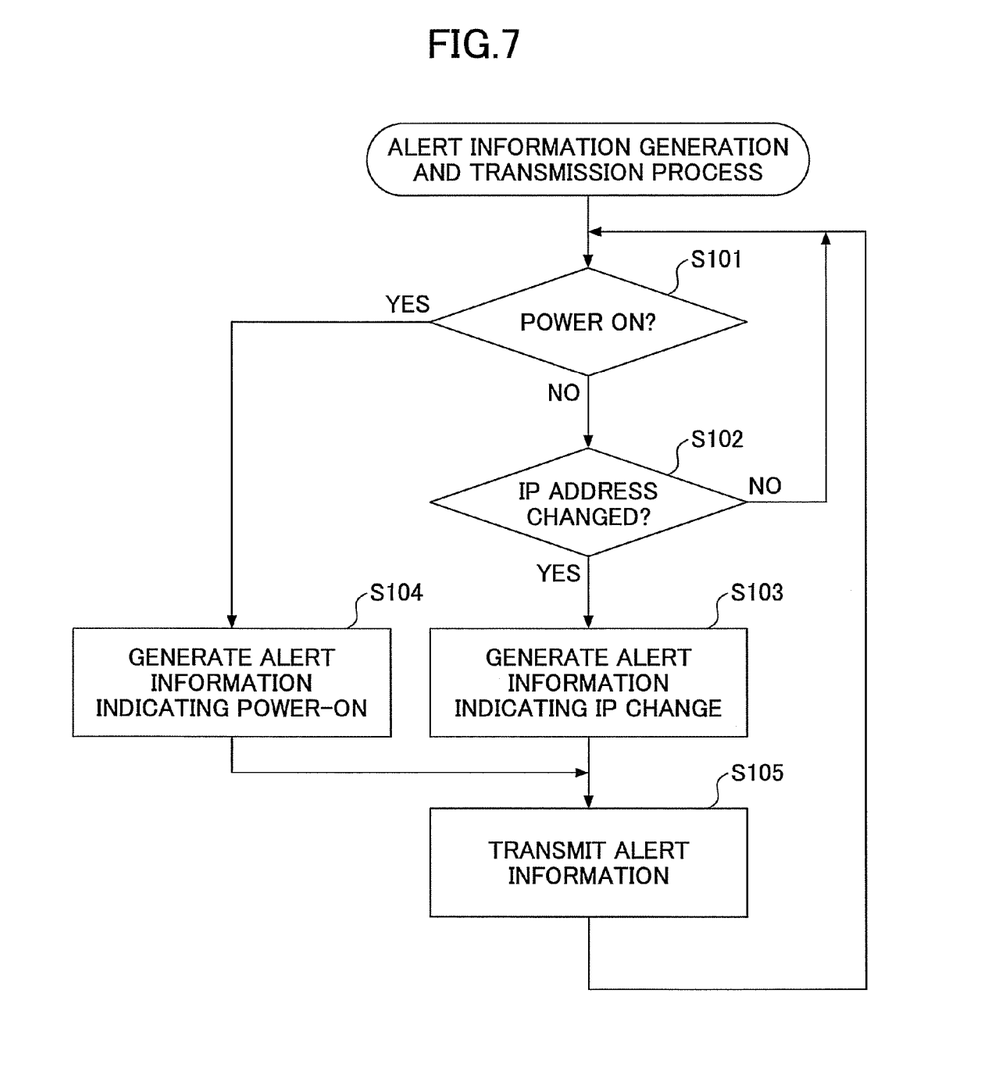
FIG. 7 is a flowchart illustrating an exemplary process of generating and transmitting alert information.
Figure 8:
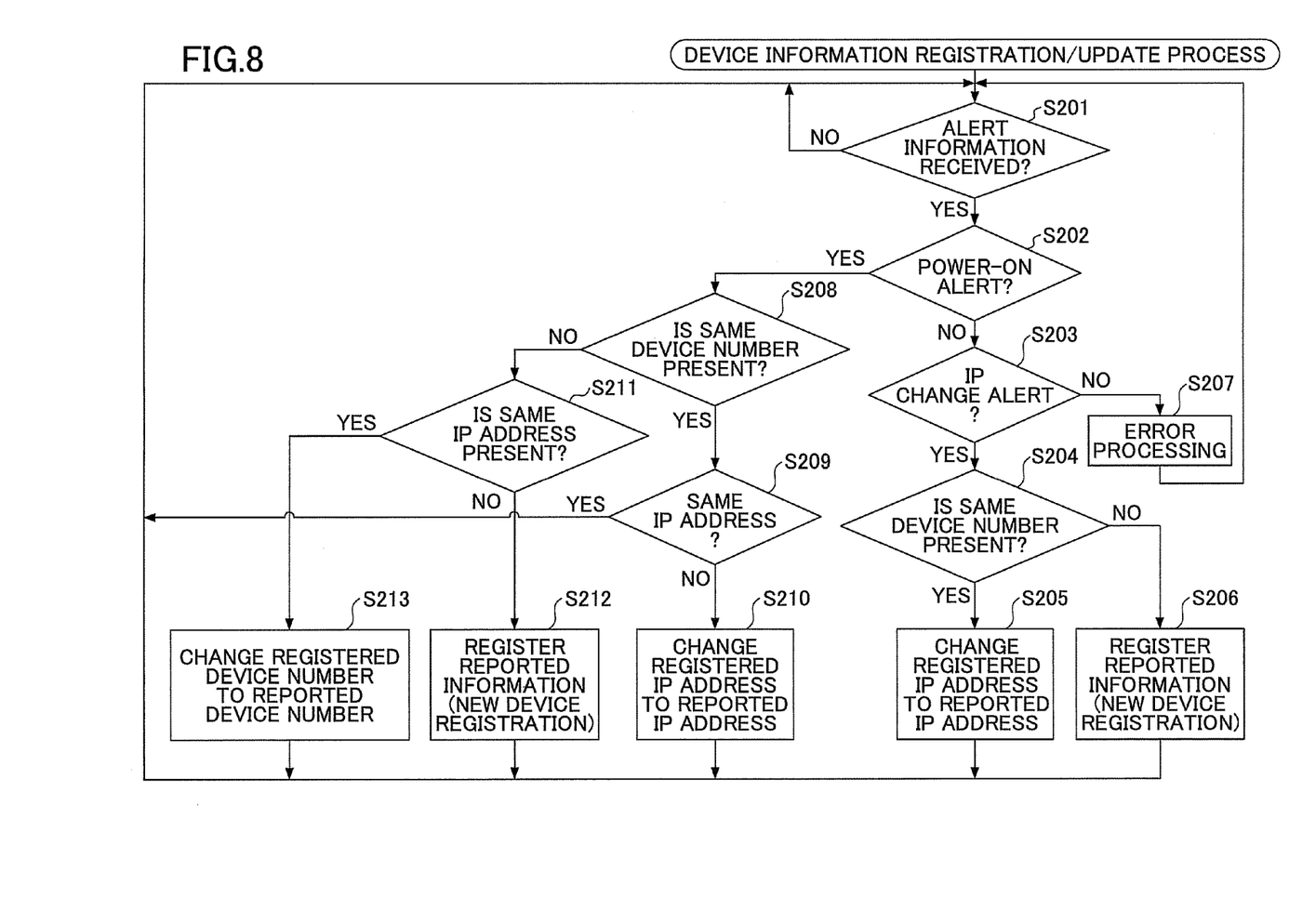
FIG. 8 is a flowchart illustrating an exemplary process of registering and updating device information.

Exemplary processes performed by the functional units of the managed device 100 and the device management apparatus 200 (collaboration among the functional units) are described below with reference to flowcharts.

In this embodiment, the functional units of the managed device 100 and the device management apparatus 200 of the device management system 1 are implemented by executing software programs installed therein. More particularly, in each of the managed device 100 and the device management apparatus 200, the software programs are loaded by a processing unit (e.g., a CPU) from a storage unit (e.g., an HDD or a ROM) into a memory (e.g., a RAM) and are executed to perform processes as described below to implement device management functions.

<Process of Generating and Transmitting Alert Information>

FIG. 7 is a flowchart illustrating an exemplary process of generating and transmitting alert information performed by the managed device 100.

As illustrated in FIG. 7, the status detection unit 12 of the managed device 100 determines whether the managed device 100 has just been powered on (step S101).

If it is determined that the managed device 100 has just been powered on (YES in step S101), the information generating unit 13 generates alert information S1 (power-on alert) (step S105). More specifically, the information generating unit 13 generates the alert information S1 as an alert message where a status change parameter (DevicePowerOn) indicating the power-on of the managed device 100, the network setting (IP address), and the device number (serial number) are defined by tags.

If it is not determined that the managed device 100 has just been powered on (NO in step S101), the status detection unit 12 determines whether the network setting (IP address) of the managed device 100 has been changed (step S102).

If it is determined that the network setting has been changed (YES in step S102), the information generating unit 13 generates alert information S2 (network-setting change alert) (step S103). More specifically, the information generating unit 13 generates the alert information S2 as an alert message where a status change parameter (IPChange) indicating the change in the network setting of the managed device 100, the changed network setting (IP address), and the device number (serial number) are defined by tags.

The information transmitting unit 14 transmits the generated alert information S to the device management apparatus 200 (step S105).

After transmitting the alert information S, the managed device 100 returns to steps S101 and S102 to detect a status change again. If a status change other than the power-on and the network setting change is detected (NO in steps S101 and S102), the managed device 100 does not perform steps S103, S104, and S105.

Thus, the managed device 100 actively transmits alert information that enables the device management apparatus 200 to determine whether it is necessary to perform a registration process or an update process on the device management information 22D.

<Process of Registering or Updating Device Information>

FIG. 8 is a flowchart illustrating an exemplary registration/update process performed by the device management apparatus 200.

As illustrated in FIG. 8, when the alert information S is received from the managed device 100 (YES in step S201), the data analysis unit 211 of the device management unit 200 analyzes the alert information S. By analyzing the alert information S, the data analysis unit 211 extracts a status change parameter (defined by <alert> tag), a network setting (defined by <IP> tag), and a device number (defined by <SerialNo> tag) from the alert information S.

Next, based on the extracted status change parameter, the alert-type determining unit 212 determines whether the alert information S is a power-on alert or a network-setting change alert (steps S202 and S203).

If the alert information S is neither a power-on alert nor a network-setting change alert (NO in steps S202 and S203), the device management apparatus 200 performs error processing (e.g., displays an error message) (step S207).

When the alert information S is a network-setting change alert (NO in step S202 and YES in step S203), the registration/update determining unit 213 determines, based on the extracted device number, whether it is necessary to update the "network setting" field of the corresponding record in the device management information 220. More specifically, the registration/update determining unit 213 compares the extracted device number with the values in the "device number" fields of records in the device management information 22D and thereby determines whether there is a record including the same device number in the device management information 22D (S204).

When there is a record including the same device number (YES in step S204), the registration/update determining unit 213 determines that it is necessary to update the "network setting" field of the record including the same device number. Then, the information registration/updating unit 214 updates the value (registered IP address) in the "network setting" field with the extracted network setting (reported IP address) (step S205). As a result, the change in the network setting of the managed device 100 is reflected in the device management information 22D of the device management apparatus 200.

Meanwhile, when there is no record including the same device number (NO in step S204), the registration/update determining unit 213 determines that it is necessary to register information extracted from the alert information S in the device management information 22D. Then, the information registration/updating unit 214 registers the extracted network setting (reported IP address) and the extracted device number (reported device number) in the device management information 22D (step S206). As a result, information on the managed device 100 whose status has changed from offline to online after a network setting change is reflected in the device management information 22D of the device management apparatus 200.

When the alert information S is a power-on alert (YES in step S202), the registration/update determining unit 213 determines, based on the extracted device number and network setting, whether it is necessary to update the "device number" field or the "network setting" field of the corresponding record in the device management information 22D. More specifically, the registration/update determining unit 213 compares the extracted device number with the values in the "device number" fields of records in the device management information 22D and thereby determines whether there is a record with the same device number in the device management information 22D (S208).

When there is a record including the same device number (YES in step S208), the registration/update determining unit 213 determines whether the value in the "network setting" field of the record including the same device number is the same as the extracted network setting (step S209).

When the value in the "network setting" field is not the same as the extracted network setting (NO in step S209), the registration/update determining unit 213 determines that it is necessary to update the "network setting" field of the record including the same device number. Then, the information registration/updating unit 214 updates the value (registered IP address) in the "network setting" field with the extracted network setting (reported IP address) (step S210). As a result, the change in the network setting resulting from the movement of the managed device 100 is reflected in the device management information 22D of the device management apparatus 200.

Meanwhile, when the value in the "network setting" field is the same as the extracted network setting (YES in step S209), the registration/update determining unit 213 determines that it is not necessary to update the "network setting" field of the record including the same device number and the process returns to step S201.

When there is no record including the same device number (NO in step S208), the registration/update determining unit 213 compares the extracted network setting with the values in the "network setting" fields of records in the device management information 22D and thereby determines whether there is a record with the same network setting in the device management information 22D (step S211).

When there is no record including the same network setting (NO in step S211), the registration/update determining unit 213 determines that it is necessary to register information extracted from the alert information S in the device management information 22D. Then, the information registration/updating unit 214 registers the extracted network setting (reported IP address) and the extracted device number (reported device number) in the device management information 22D (step S212). As a result, information on a newly-installed managed device 100 is registered in the device management information 220 of the device management apparatus 200.

Meanwhile, when there is a record including the same network setting (YES in step S211), the registration/update determining unit 213 determines that it is necessary to update the "device number" field of the record including the same network setting. Then, the information registration/updating unit 214 updates the value (registered device number) in the "device number" field with the extracted device number (reported device number) (step S213). As a result, information on a new managed device 100 that has replaced an existing managed device 100 is registered (i.e., the replacement is reflected) in the device management information 22D of the device management apparatus 200.

<Summary>

In the device management system 1 of this embodiment, the information reporting unit 11 of the managed device 100 performs a process as described below. The status detection unit 12 detects a status change (such as power-on/off or a network setting change) of the managed device 100. Based on the detected status change, the information generating unit 13 generates alert information that enables the device management apparatus 200 to determine whether it is necessary to perform a registration process or an update process on the device management information 22D. Then, the information transmitting unit 14 transmits the generated alert information to the device management apparatus 200.

Meanwhile, the device information management unit 21 of the device management apparatus 200 performs a process as described below. When the alert information is received from the managed device 100, the data analysis unit 211 analyzes the alert information and the alert-type determining unit 212 determines the type of the alert information based on a status change parameter extracted from the alert information. The registration/update determining unit 213 refers to the device management information 22D based on device identification information extracted from the alert information to determine whether it is necessary to perform a registration process or an update process on the device management information 22D. If it is determined that it is necessary to perform a registration process or an update process, the information registration/updating unit 214 registers information extracted from the alert information in the device management information 22D or updates the corresponding information item in the device management information 22D with the information extracted from the alert information.

The device management system 1 configured as described above makes it possible to flexibly and reliably detect changes in the system configuration, and also makes it possible to reduce the network traffic related to the detection of changes in the system configuration.

The device management functions of the above embodiment may be implemented by executing programs by processing units (e.g., CPUs) of the managed device 100 and the device management apparatus 200 constituting the device management system 1. The programs may be written in a programming language(s) supported by the operating environments (platforms) of the managed device 100 and the device management apparatus 200.

The programs to be executed by the managed device (image processing device) 100 may be stored in a computer-readable storage medium (e.g., the storage medium 114a) and installed into the managed device 100 via the external storage I/F 114. Alternatively, the programs may be downloaded and installed via a telecommunication line and the network I/F 113 into the managed device 100.

In the above embodiment, it is assumed that a network setting (destination IP address) of the device management apparatus 200 is preset in the information reporting unit 11 of the managed device 100.

With this configuration, however, every time a managed device 100 is installed in the device management system 1, it is necessary to set the network setting of the device management apparatus 200 in the managed device 100. Apparently, this increases the work load of the system administrator. To prevent this problem, the network setting of the device management apparatus 200 may be automatically set in the managed device 100.

For example, a "front-end" address used to acquire the network setting of the device management apparatus 200 may be preset in the managed device 100. The front-end address is the network setting (an IP address) of an external server for managing multiple device management systems 1 and is common to the device management systems 1. Therefore, the front-end address can be set in the managed device 100 before the factory shipment. In the external server, network settings of device management apparatuses 200 are associated with network settings of managed devices 100 to be managed by the device management apparatuses 200.

When the managed device 100 is installed in one of the device management systems 1, the managed device 100 requests the external server based on the front-end address to send the network setting of the corresponding device management apparatus 200. Then, the managed device 100 sets the network setting of the device management apparatus 200 sent from the external server in the information reporting unit 11. This configuration eliminates the need for the system administrator to manually set the network setting of the device management apparatus 200 in the managed device 100.

As described above, an aspect of this disclosure provides a managed device, a device management apparatus, a device management system, and a device management method that make it possible to flexibly and reliably detect changes in a system configuration.

The present invention is not limited to the specifically disclosed embodiments, and variations and modifications may be made without departing from the scope of the present invention.

What is claimed is:

1. A device management apparatus connected via a network to a managed device, the device management apparatus comprising:

a storing unit configured to store device management information for managing the managed device;

a registration/update determining unit configured to compare alert information received from the managed device having an internal detection unit configured to detect a status change indicating a power-on or a network setting change of the managed device, with the device management information and to determine, based on the comparison result, whether it is necessary to perform a registration process or an update process on the device management information;

a registration/updating unit configured to register information extracted from the alert information in the device management information or update a corresponding information item in the device management information with the information extracted from the alert information if the registration/update determining unit determines that it is necessary to perform the registration process or the update process;

an analysis unit configured to analyze the alert information and extract a status change parameter indicating the power-on or the network setting change of the managed device, a network setting of the managed device, and a device number of the managed device from the alert information; and an alert-type detetermining unit configured to determine a type of the alert information based on the status change parameter, wherein the registration/update determining unit is configured to determine whether it is necessary to perform the registration process or the update process based also on the type of the alert information.

2. The device management apparatus as claimed in claim 1, wherein
when the status change parameter indicates the network setting change, the registration/update determining unit compares the device number extracted from the alert information with device numbers registered in the device management information;
when the device number extracted from the alert information matches one of the device numbers registered in the device management information, the registration/update determining unit determines that it is necessary to update a network setting registered in association with the one of the device numbers in the device management information with the network setting extracted from the alert information; and
when the device number extracted from the alert information does not match any one of the device numbers registered in the device management information, the registration/update determining unit determines that it is necessary to register the network setting and the device number extracted from the alert information in the device management information.

3. The device management apparatus as claimed in claim 1, wherein
when the status change parameter indicates the power-on, the registration/update determining unit compares the device number extracted from the alert information with device numbers registered in the device management information;
when the device number extracted from the alert information matches one of the device numbers registered in the device management information, the registration/update determining unit compares the network setting extracted from the alert information with a network setting registered in association with the one of the device numbers in the device management information; and
when the network setting extracted from the alert information does not match the network setting registered in association with the one of the device numbers, the registration/update determining unit determines that it is necessary to update the network setting registered in association with the one of the device numbers with the network setting extracted from the alert information.

4. The device management apparatus as claimed in claim 3, wherein
when the status change parameter indicates the power-on and the device number extracted from the alert information does not match any one of the device numbers registered in the device management information, the registration/update determining unit compares the network setting extracted from the alert information with network settings registered in the device management information;
when the network setting extracted from the alert information matches one of the network settings registered in the device management information, the registration/update determining unit determines that it is necessary to update a device number registered in association with the one of the network settings in the device management information with the device number extracted from the alert information; and
when the network setting extracted from the alert information does not match any one of the network settings registered in the device management information, the registration/update determining unit determines that it is necessary to register the network setting and the device number extracted from the alert information in the device management information.

5. A device management system, comprising:
at least one managed device; and
a device management apparatus connected via a network to the managed device, wherein
the managed device includes
a detection unit configured to detect a status change indicating a power-on or a network setting change of the managed device,
a generating unit configured to generate alert information based on the detected status change, and
a transmitting unit configured to transmit the generated alert information to the device management apparatus; and
the device management apparatus includes
a storing unit configured to store device management information for managing the managed device,
a registration/update determining unit configured to compare the alert information received from the managed device with the device management information and determine, based on the comparison result, whether it is necessary to perform a registration process or an update process on the device management information,
a registration/updating unit configured to register information extracted from the alert information in the device management information or update a corresponding information item in the device management information with the information extracted from the alert information if the registration/update determining unit determines that it is necessary to perform the registration process or the update process,
an analysis unit configured to analyze the alert information and extract a status change parameter indicating the power-on or the network setting change of the managed device, a network setting of the managed device, and a device number of the managed device from the alert information, and
an alert-type determining unit configured to determine a type of the alert information based on the status change parameter,
wherein the registration/update determining unit is configured to determine whether it is necessary to perform the registration process or the update process based also on the type of the alert information.

6. The device management system as claimed in claim 5, wherein the generating unit generates the alert information including a status change parameter indicating the detected status change, a network setting of the device, and a device number of the device.

* * * * *